(12) United States Patent
Liang et al.

(10) Patent No.: US 9,924,430 B2
(45) Date of Patent: Mar. 20, 2018

(54) HETEROGENEOUS NETWORK SWITCHING METHOD, DEVICE AND SYSTEM

(71) Applicant: China Academy of Telecommunications Technology, Beijing (CN)

(72) Inventors: Jing Liang, Beijing (CN); Haiyang Quan, Beijimg (CN)

(73) Assignee: China Academy of Telecommunications Technology, Beijing (CN)

( * ) Notice: Subject to any disclaimer, the term of this patent is extended or adjusted under 35 U.S.C. 154(b) by 207 days.

(21) Appl. No.: 14/760,365

(22) PCT Filed: Jan. 7, 2014

(86) PCT No.: PCT/CN2014/070234
§ 371 (c)(1),
(2) Date: Jul. 10, 2015

(87) PCT Pub. No.: WO2014/108056
PCT Pub. Date: Jul. 17, 2014

(65) Prior Publication Data
US 2015/0358876 A1 Dec. 10, 2015

(30) Foreign Application Priority Data
Jan. 11, 2013 (CN) .......................... 2013 1 0011995

(51) Int. Cl.
*H04W 36/14* (2009.01)
*H04W 36/00* (2009.01)
(Continued)

(52) U.S. Cl.
CPC ....... *H04W 36/14* (2013.01); *H04W 36/0061* (2013.01); *H04W 36/0072* (2013.01); *H04W 84/12* (2013.01); *H04W 88/06* (2013.01)

(58) Field of Classification Search
CPC ............. H04W 36/14; H04W 36/0061; H04W 36/0072
See application file for complete search history.

(56) References Cited

U.S. PATENT DOCUMENTS

| 7,764,652 B2 * | 7/2010 | Wu ...................... H04W 76/064 370/331 |
| 2010/0278150 A1 | 11/2010 | Park et al. |

(Continued)

FOREIGN PATENT DOCUMENTS

| CN | 101835201 A | 9/2010 |
| CN | 101841880 | 9/2010 |

(Continued)

OTHER PUBLICATIONS

International Search Report for PCT/CN2014/070234 dated Apr. 16, 2014.

*Primary Examiner* — Wei Zhao
(74) *Attorney, Agent, or Firm* — Foley & Lardner LLP

(57) ABSTRACT

Disclosed are a heterogeneous network switching method, device and system, relating to the technique of communication. When a network-side device such as a base station determines that a UE needs to be switched into a non-3GPP network, switch signaling carrying switch indication information is sent to the UE; the switch indication information is used for instructing the UE to switch some of or all of the bearers from a 3GPP network to a non-3GPP network, so that the UE can switch some of all of the bearers from a 3GPP network to a non-3GPP network according to the switch indication information, thus realizing heterogeneous network switching initiated by a network side.

14 Claims, 5 Drawing Sheets

(51) Int. Cl.
*H04W 84/12* (2009.01)
*H04W 88/06* (2009.01)

(56) References Cited

U.S. PATENT DOCUMENTS

| | | | | |
|---|---|---|---|---|
| 2010/0323700 A1* | 12/2010 | Bachmann | ........ | H04W 36/0066 455/436 |
| 2011/0040836 A1* | 2/2011 | Allen | ................ | H04L 65/1093 709/205 |
| 2012/0020345 A1* | 1/2012 | Zhou | ...................... | H04L 12/14 370/338 |
| 2014/0082697 A1* | 3/2014 | Watfa | ................ | H04W 76/025 726/3 |

FOREIGN PATENT DOCUMENTS

| | | |
|---|---|---|
| CN | 102164390 | 8/2011 |
| CN | 102572973 A | 7/2012 |
| CN | 102695234 A | 9/2012 |
| CN | 102833813 A | 12/2012 |
| WO | WO-2011/157152 | 12/2011 |
| WO | WO-2012/144731 | 10/2012 |
| WO | WO-2012/149954 | 11/2012 |

\* cited by examiner

HETEROGENEOUS NETWORK SWITCHING METHOD, DEVICE AND SYSTEM

This application is a US National Stage of International Application No. PCT/CN2014/070234, filed on Jan. 7, 2014, designating the United States and claiming the benefit of priority to Chinese Patent Application No. 201310011995.7, filed with the State Intellectual Property Office of People's Republic of China on Jan. 11, 2013 and entitled "Heterogeneous network switching method, device and system", the content of which is hereby incorporated by reference in its entirety.

FIELD

The present invention relates to the field of communications and particularly to a heterogeneous network switching method, device and system.

BACKGROUND

Along with the growing demands of subscribers and the developing communication technologies, more and more wireless communication technologies and related networks are emerging, e.g., the 2G/3G/4G mobile communication technologies and network capable of providing wide coverage, so there are a large number of emerging scenarios in which different types of communication networks coexist, e.g., a scenario in which the 2G/3G/4G networks coexist the WLAN network.

Methods of a User Equipment (UE) performing switching in various scenarios will be introduced below in details.

1. There is a scenario in which the Universal Mobile Telecommunications System (UNITS)/Long Term Evolution (LTE) network coexists with the WLAN network.

The Evolved Packet System (EPS) is a system which supports various access technologies and mobility between them. In the multi-access scenario, the UE may be covered jointly by a number of $3^{rd}$ Generation Partnership Project (3GPP) and/or non-3GPP access networks. These access networks may operate with different access technologies, may be served by different operators and also may provide accesses to different core networks. FIG. 1 illustrates the scenario in which the UMTS/LTE network coexists with the WLAN network, where there are a number of Access Points (APs) in coverage areas of base stations of the UMTS/LTE networks (a Node B in the UMTS network and an evolved Node B (eNB) in the LTE network), and coverage areas of the access points are smaller than those of the base stations, FIG. 2 illustrates a currently supported network architecture in which the UMTS/LTE network interoperates with the WLAN network. In this architecture, the network intemperate can be completed via an S2c interface between a Packet Data Network (PDN) Gateway and the UE. At present the UNITS/LTE network interoperates with the WEAN network generally in a UE-based scheme.

2. There is a scenario in which traffic is offloaded through the WLAN network.

In the existing heterogeneous network scenario, traffic is offloaded for the UMTS/ETE network through the WLAN network, where there are generally two scenarios of seamless offloading and non-seamless offloading.

As illustrated in FIG. 3, seamless offloading refers to that there is a connection between the WLAN network and the 3GPP Core Network (CN), and traffic offloaded via the air interface still accesses the 3GPP (including UMTS/LTE) core network. As illustrated in FIG. 4, non-seamless offloading refers to that there is no connection between the WLAN network and the 3GPP Core Network (CN), and traffic offloaded via the air interface accesses the Internet directly without going through the 3GPP CN.

For offloading through the WLAN, a part of bearers of the UE may be transferred, or all the bearers of the UE may be transferred, and if a part of bearers of the UE are transferred, then the UE will be connected with both the UMTS/LTE network and the WLAN network; or if all the bearers of the UE are transferred, then the UE will be connected with only the WLAN network after they are transferred.

Further to the network scenarios and architecture above, there is an existing network selection mechanism enforced based upon the Access Network Discovery and Selection Function (ANDSF) policy. Here FIG. 5 illustrates the architecture of communication between the ANDSF and the UE, where the UE interacts with the ANDSF via an S14 interface which is an interface based upon the Internet Protocol (IP). The UE communicates with the ANDSF in both a pull mode and a push mode, where the UE pushes a request to the ANDSF on its own initiative in the former mode, and the ANDSF pushes a message on its own initiative in latter mode.

Based upon an operator policy, the ADNSF provides the UE with network discovery and selection related information including an Inter-System Mobility Policy (ISMP), Access Network Discovery Information (ANDI), and an Inter-System Routing Policy (ISRP), where:

The ISMP includes a series of operator defined rules and preferences, and this policy defines whether to allow inter-system mobility, the most appropriate type of access technology to access the Evolved Packet Core (EPC), different priorities of different access technologies, and other information. The ISMP can be preconfigured in the UE or can be transmitted when requested by the UE or can be pushed to the UE by the ANDSF under some trigger. For example the ANDSF can issue a policy with the priority of the WLAN network being higher than that of the LTE network, so that the WLAN system will be selected preferentially for an access when the UE is covered by both of the networks.

The ANDI can provide the UE with a list of available access networks, proximate to the UE, of a requested access type, and related parameters, e.g., access technologies (e.g., WLAN, Worldwide Interoperability for Microwave Access, WiMAX, etc.), radio access network identifiers, carrier frequencies, etc.

The ISRP includes some information required for inter-system routing, and for a UE with multiple radio access interfaces, e.g., a UE supporting IP Flow Mobility (IFOM) or Multi-Access PDN Connectivity (MAPCON), the information can be used to determine: a) over which of the available access networks to transmit data when a particular routing condition is satisfied; and b) when to prohibit an access to some access network for a particular IP data flow and/or a particular Access Point Name (APN).

Typically the ANDSF selects the ISMP, the ANDI and the ISRP to be provided to the UE, as required by the operator and according to a roaming protocol, and the ANDSF can provide all these three policies or can provide only a part of the policies. The ANDSF can interact with some database in the operator network, e.g., a Home Subscriber Server (HSS), etc., to retrieve information as required.

When the UE receives information about an available access network with a higher priority than that of the current access network, the UE shall perform a discovery and reselection procedure to the access network with the higher priority if this is allowed by the user. When the UE selects the access network automatically, the UE can not access the EPC through an access network marked in the ISMP as prohibited.

Apparently there is only a UE-based method but no network-based method for switching between the UMTS/LTE and WLAN networks at present. The UE-based solutions generally switch between the networks under a semi-static policy so that the UE may be switched even if the network condition is not appropriate, thus resulting in a degraded experience, and even a dropped call, of the user.

SUMMARY

Embodiments of the invention provide a heterogeneous network switching method, device and system so as to enable heterogeneous network switching to be initiated at the network side.

A heterogeneous network switching method includes:

determining that a User Equipment (UE) needs to be switched to a non-Third Generation Partnership Project (3GPP) network; and transmitting, to the UE, switch signaling which carries a switch instruction to instruct the UE to switch a part or all of carriers from a 3GPP network to the non-3GPP network.

A heterogeneous network switching method includes:

receiving switch signaling, which carries a switch instruction, transmitted by a base station after the base station determines that a User Equipment (UE) needs to be switched to a non-Third Generation Partnership Project (3GPP) network; and switching a part or all of bearers from a 3GPP network to the non-3GPP network in response to the switch instruction.

A heterogeneous network switching device includes:

a determining unit configured to determine that a User Equipment (UE) needs to be switched to a non-Third Generation Partnership Project (3GPP) network; and a transmitting unit configured to transmit, to the UE, switch signaling which carries a switch instruction to instruct the UE to switch a part or all of carriers from a 3GPP network to the non-3GPP network.

A heterogeneous network switching device includes:

a receiving unit configured to receive switch signaling, which carries a switch instruction, transmitted by a base station after the base station determines the User Equipment (UE) needs to be switched to a non-Third Generation Partnership Project (3GPP) network; and a switching unit configured to switch a part or all of bearers from a 3GPP network to the non-3GPP network in response to the switch instruction.

A heterogeneous network switching system includes:

a base station configured to determine that a User Equipment (UE) needs to be switched to a non-Third Generation Partnership Project (3GPP) network; and transmit, to the UE, switch signaling which carries a switch instruction to instruct the UE to switch a part or all of carriers from a 3GPP network to the non-3GPP network; and the UE configured to receive the switch signaling, which carries the switch instruction, transmitted by the base station after the base station determines the UE needs to be switched to the non-3GPP network; and to switch a part or all of the bearers from the 3GPP network to the non-3GPP network in response to the switch instruction.

The embodiments of the invention provide a heterogeneous network switching method, device and system so that when the base station or another network-side device determines that the UE needs to be switched to the non-3GPP network, the network-side device transmits to the UE the switch signaling carrying the switch instruction to instruct the UE to switch a part or all of the bearers from the 3GPP network to the non-3GPP network, so that the UE can switch a part or all of the bearers from the 3GPP network to the non-3GPP network in response to the switch instruction, thus enabling heterogeneous switching to be initiated at the network side.

DETAILED DESCRIPTION OF THE EMBODIMENTS

The embodiments of the invention provide a heterogeneous network switching method, device and system so that when a network-side device, such as base station, determines a UE to be switched to a non-3GPP network, the network-side device transmits, to the UE, switch signaling which carries an switch instruction for instruct the UE to switch a part or all of bearers from a 3GPP network to the non-3GPP network, so that the UE can switch a part or all of the bearers from the 3GPP network to the non-3GPP network in response to the switch instruction, thus enabling heterogeneous switching to be initiated at the network side.

Figure 1:
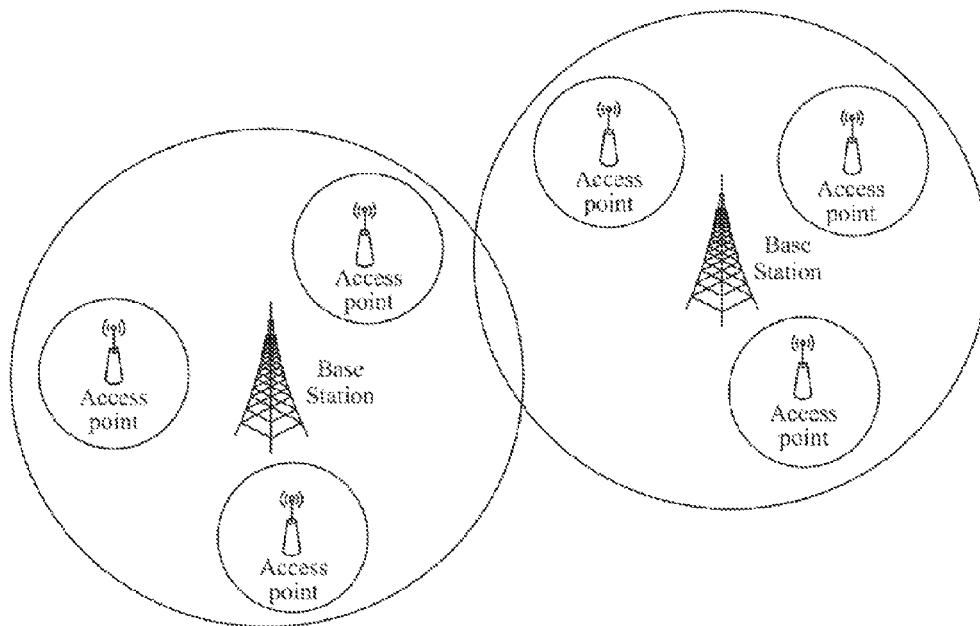
FIG. 1 illustrates a schematic diagram of the scenario in which the UMTS/LTE network coexists with the WLAN network in the prior art.
Figure 2:
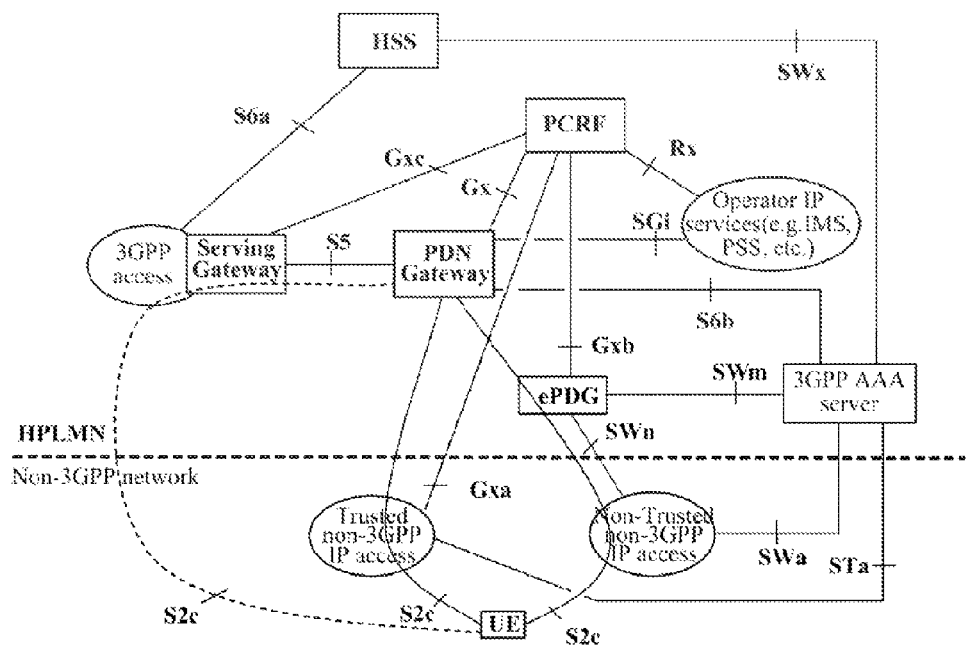
FIG. 2 illustrates a schematic diagram of the network arch e in which the UMTS/LTE network interoperates with the WLAN network in the prior art.
Figure 3:
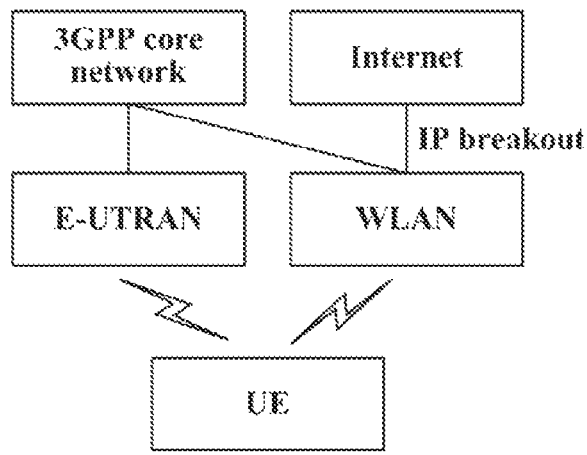
FIG. 3 illustrates a schematic diagram of the scenario of seamless offloading in heterogeneous network switching in the prior art.
Figure 4:
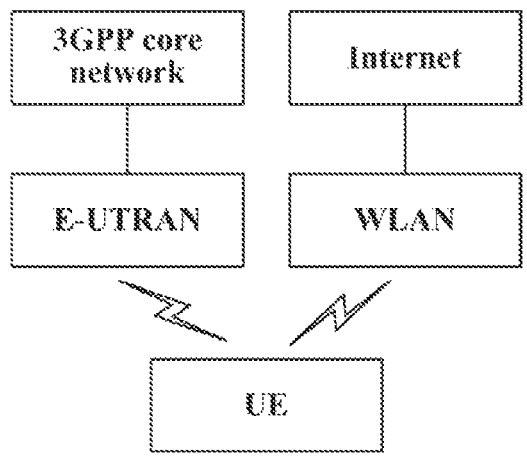
FIG. 4 illustrates a schematic diagram of the scenario of non-seamless offloading in heterogeneous network switching in the prior art.
Figure 5:
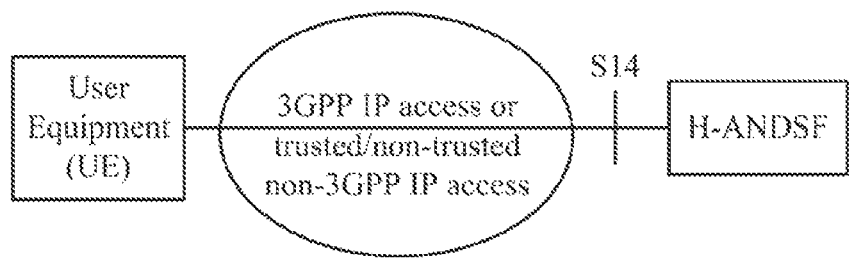
FIG. 5 illustrates a schematic diagram of the architecture of communication between the ANSDF and the UE in the prior art.
Figure 6:
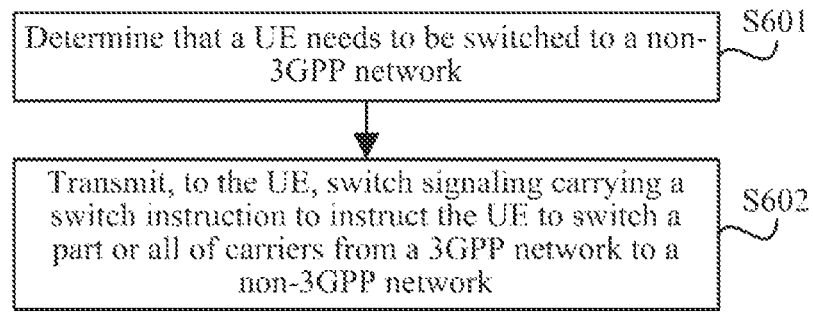
FIG. 6 illustrates a first flow chart of a heterogeneous network switching method according to an embodiment of the invention.

As illustrated in FIG. 6, a heterogeneous network switching method according to an embodiment of the invention includes:

The operation S601 is to determine that a UF needs to be switched to a non-3GPP network; and The operation 602 is to transmit, to the UE, switch signaling carrying a switch instruction to instruct the UE to switch a part or all of carriers from a 3GPP network to a non-3GPP network.

With the heterogeneous network switching method, the network side can initiate heterogeneous network switching upon determining the UE to be switched to the non-3GPP network.

The method is typically performed by a base station or can be performed by another network element at the network side dependent upon a real condition in practice.

Particularly it is determined that the UE needs to be switched to the non-3GPP network in the operation S601 as follows:

The UE is determined to be located in a coverage area of the non-3GPP network; or The UE is determined to be located in a coverage area of the non-3GPP network, and traffic of the UE is determined to be offloaded according to a load of the network side.

Since it is the network side that determines whether the UE needs to be switched to the non-3GPP network, the network side can determine it according to a channel quality of the UE, a network load of the network side, and other factors, so that the UE can be avoided from being switched when there is an inappropriate network condition, so as to provide a user with a better experience.

In order to enable the UE to locate a corresponding AP accurately, the switch instruction can include an identifier of a target AP in the non-3GPP network, and the UE can locate the corresponding AP according to the identifier of the target AR The UE can switch a part or all of the bearers from the 3GPP network to the non-3GPP network in a redirection procedure or in a reconfiguration procedure. When the UE switches the bearers in a redirection procedure, the switch signaling is particularly a Radio Resource Control (RRC) Connection Release message; and when the UE switches the bearers in a reconfiguration procedure, the switch signaling is particularly an RRC Connection Reconfigure message.

When the switch signaling is an RRC Connection Release message, that is, when the UE switches the bearers in a redirection procedure, releasing of the bearers of the UE needs to be initiated at the network side, and at this time the method further includes:

Requesting the core network for releasing a part or all of the bearers of the UE.

In order to further improve the experience of the user and avoid the use by the user from being affected by switching for a long period of time, the switch signaling further includes:

A switch timing instruction instructs the UE to keep connected with the source network or to access the source network again when the UE has not be associated with a target AP successfully after a preset period of time is exceeded.

In the preset period of time, the UE searches for an appropriate AP according to information in the switch signaling, and if the UE still has not located any appropriate AP for association after the preset period of time is exceeded, then the UE keeps connected with the source network (a UMTS/LTE network), or accesses the source network again if the UE has been disconnected from the source network.

Figure 7:
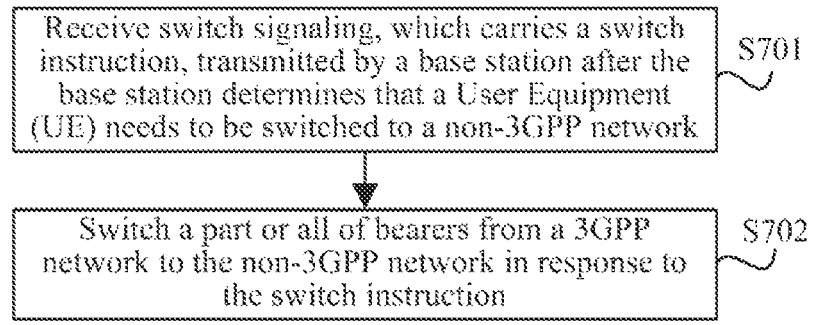
FIG. 7 illustrates a second flow chart of a heterogeneous network switching method according to an embodiment of the invention.

Accordingly an embodiment of the invention further provides a heterogeneous network switching method at the UE side, as illustrated in FIG. 7, the method including:

The operation S701 is to receive switch signaling, carrying a switch instruction, transmitted by a base station which determines that a User Equipment (UE) needs to be switched to a non-3GPP network; and The operation S702 is to switch apart or all of bearers from a 3GPP network to the non-3GPP network in response to the switch instruction.

The method is typically performed by the UE.

In an implementation, a base station determines that the UE needs to be switched to the non-3GPP network as follows:

The UE is determined to be located in a coverage area of the non-3GPP network; or The UE is determined to be located in a coverage area of the non-3GPP network, and traffic of the UE is determined to be offloaded according to a load of the base station.

Alike the switch instruction includes:

An identifier of a target Access Point (AP) in the non-3GPP network.

The switch signaling is particularly an RRC Connection Release message or an RRC Connection Reconfigure message.

When the switch signaling is an RRC Connection Release message, a part or all of the bearers are switched from the 3GPP network to the non-3GPP network in response to the switch instruction as follows:

An air interface connection is released, and a corresponding access point to he associated is searched for in response to the switch instruction, and A corresponding PDN connection is set up or the Internet is accessed; and When the switch signaling is an RRC Connection Reconfigure message, a part or all of the bearers are switched from the 3GPP network to the non-3GPP network in response to the switch instruction as follows:

A corresponding access point to be associated is searched for,

A corresponding PDN connection is set up or the Internet is accessed, and

An RRC Connection Reconfigure Complete message is transmitted to the base station to notify the base station that the corresponding switching of the bearers has been completed.

In order to further improve the experience of a user and avoid the use by the user from being affected by switching for a long period of time, the method further includes:

The UE keeps connected with the source network or access the source network again when it is determined against a switch timing instruction in the switch signaling that the UE has not be associated with a target AP successfully after a preset period of time is exceeded.

Particularly when heterogeneous network switching is performed in a redirection procedure, firstly the base station perform redirection in the RRC Connection Release procedure by adding the identifier of the target AP (e.g., a frequency, a Service Set Identifier (SSID), etc.) to the RRC Connection Release message; and after the UE receives the RRC Connection Release message, the Access Stratum (AS) of the UE releases the air interface connection and also notifies the Non-Access Stratum (NAS) that the connection needs to be switched to a WLAN network (where an ANDSF policy in which switching is triggered at a lower layer may be added), and at this time the NAS stratum of the UE triggers a MILAN module of the UE to search for a corresponding access point for association (for an access), according to previously received redirection information. After being associated successfully with the AP, the UE can set up a corresponding PDN connection (seamless offload) through the WLAN network or access the Internet (non-seamless offload). Furthermore a redirection timer can be set for WLAN redirection, and the UE searches for an appropriate AP according to the redirection information in a time length of the timer, and if the UE still has not located any appropriate AP for association When the timer expires, then the UE accesses the source network (a UMTS/LTE network) again.

Particularly when heterogeneous network switching is performed in the reconfiguration procedure, firstly the base station performs the RRC Connection Reconfigure procedure by adding a new parameter to the RRC Connection Reconfigure message to trigger switching of the bearers to the WLAN network, where the new parameter includes the identifier of the target AP (e.g., a frequency, an SSID, etc.); and also the base station requests the core network for releasing a part or all of the bearers of the UE; and after the UE receives the Reconfigure message, the AS stratum notifies the NAS stratum that apart or all of the bearers need to be switched to a WLAN network (where an ANDSF policy in which switching is triggered at a lower layer may be added), and at this time the NAS stratum of the UE triggers a WLAN module of the UE to search for a corresponding access point for association (for an access). After being associated successfully with the AP, the UE can set up a corresponding PDN connection (seamless offload) through the WLAN network or access the Internet (non-seamless offload), and the AS stratum of the UE transmits an RRC Connection Reconfigure Complete message to the base station to notify the base station that the corresponding switching of the bearers has been completed. Furthermore a timer can be set for WLAN redirection, and the UE searches for an appropriate AP according to information in the Reconfigure message in a time length of the timer, and if the UE still has not located any appropriate AP for association when the timer expires, then the UE keeps connected with the source network (a UMTS/LTE network).

The heterogeneous network switching method according to the embodiments of the invention will be described below in details in particular embodiments thereof.

First Embodiment

The embodiment relates to heterogeneous network switching triggered in the redirection procedure, where all the bearers are switched.

Figure 8:
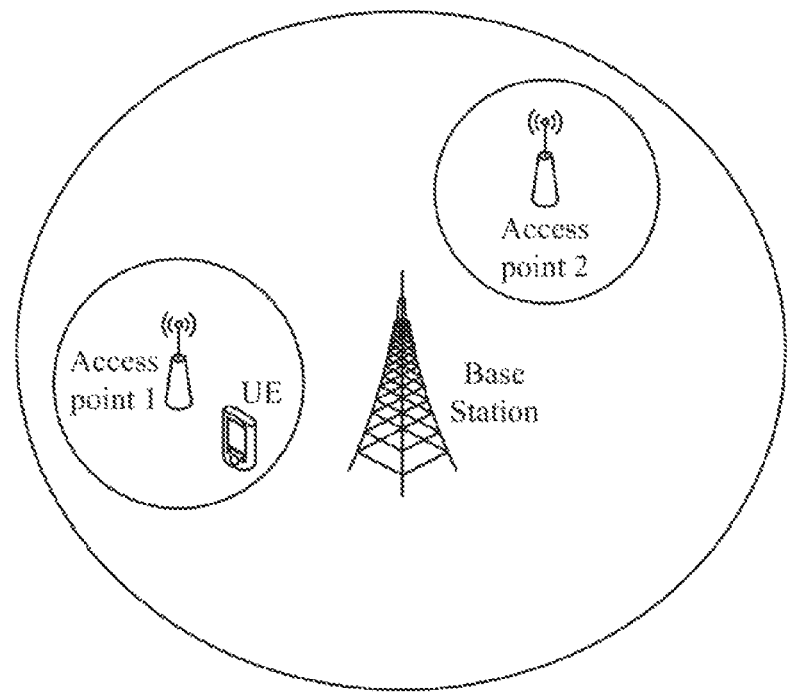
FIG. 8 illustrates a schematic diagram of a scenario of heterogeneous network switching according to an embodiment of the invention.

FIG. 8 illustrates the network scenario where the base station can be the Node B in the UMTS system or can be the eNB in the LTE system.

When the UE is located in an area covered by the base station and the access point 1, the base station decides to offload traffic of the UE to the WLAN network, in an algorithm of the base station due to a load thereof or another reason, so that all the connections of the UE are switched to the WLAN network. At this time the base station transmits to the UE the RRC Connection Release message carrying redirection information of the WLAN AP, including the frequency, the SSID, etc., of the access point 1. Upon reception of the message, the UE releases the RRC connection and also notifies the NAS stratum that the connection needs to be switched to the WLAN network, and then the NAS stratum instructs the WLAN module to be enabled, and searches for a corresponding access point for association (for an access) according to the previously received redirection information; and after being associated successfully with the AP, the UE can set up a corresponding PDN connection through the WLAN network (seamless offload) or access the Internet (non-seamless offload). For seamless offload, the UE and the 3GPP CN need to modify routing information of the current traffic by instructing the traffic to be transmitted over the WLAN network; and for non-seamless offload, the NAS stratum can deactivate all the traffic (the PDN connection) of the UE at the UMTS/LTE network or can only maintain the bearers (without transmitting any traffic).

Furthermore the WLAN redirection timer can be carried in the redirection message, and the UE searches for an appropriate AP according to the redirection information in the time length of the timer, and if the UE still has not located any appropriate AP for association when the timer expires, then the UE accesses the source network (the UMTS/LTE network) again.

Second Embodiment

The embodiment relates to heterogeneous network switching triggered in the reconfiguration procedure, where a part of the bearers are switched.

FIG. 8 illustrates the network scenario where the UE currently sets up two bearers with the base station, and there is traffic carried over each of the bearers. When the UE is located in an area covered by the base station and the access point 1, the base station decides to offload traffic of the UE to the WLAN network, according to an algorithm of the base station due to a load thereof or another reason, so that bearer 1 (the traffic 1) of the UE is switched to the WLAN network. At this time the base station transmits to the UE the RRC Connection Reconfigure message carrying information about the WLAN AP including the frequency, the SSID, etc., of the access point 1, and information about the bearer 1 (the traffic 1) to be switched to the WLAN network. Upon reception of the message, the UE notifies the NAS stratum that the bearer 1 (the traffic 1) needs to be switched to the WLAN network, and then the NAS stratum instructs the WLAN module to be enabled, and searches for a corresponding access point for association (for an access) according to the previously received information about the WLAN AP; and after being associated successfully with the AP, the UE can set up a corresponding PDN connection through the WLAN network (seamless offload) or access the Internet (non-seamless offload). For seamless offload, the UE and the 3GPP CN need to modify routing information of the traffic 1 by instructing the traffic to be transmitted over the WLAN network; and for non-seamless offload, the NAS stratum can deactivate the traffic 1 of the UE at the UNITS/LTE network or can only maintain the bearer (without transmitting any traffic). The AS stratum of the UE transmits the RRC Connection Reconfigure Complete message to the base station to notify the base station that the switching the bearer 1 has been completed.

Furthermore the WLAN switch timer can be carried in the reconfiguration message, and the UE searches for an appropriate AP according to the redirection information in the time length of the timer, and if the UE still has not located any appropriate AP for association when the timer expires, then the UE still keeps connected with the source network (the UMTS/LTE network). The UE transmits the RRC Connection Reconfigure Complete message to the network and indicates the failure in switching the bearer 1.

Third Embodiment

The embodiment relates to heterogeneous network switching triggered in the reconfiguration procedure, where all the bearers are switched.

FIG. 8 illustrates the network scenario, When the UE is located in an area covered by the base station and the access point 1, the base station decides to offload traffic of the UE to the WLAN network, according to an algorithm of the base station due to a load thereof or another reason, so that all the connections (connections) of the UE are switched to the WLAN network. At this time the base station transmits to the UE the RRC Connection Reconfigure message carrying information about the WLAN AP, including the frequency, the SSID, etc., of the access point 1, and an instruct to switch all the bearers. Upon reception of the message, the UE notifies the NAS stratum that all the bearers need to be switched to the WLAN network, and then the NAS stratum instructs the WLAN module to be enabled, and searches for a corresponding access point for association (for an access) according to the previously received information about the WLAN AP; and after being associated successfully with the AP, the UE can set up a corresponding PDN connection through the WLAN network (seamless offload) or access the Internet (non-seamless offload). For seamless offload, the UE and the 3GPP CN need to modify routing information of all the traffic by instructing the traffic to be transmitted over the WLAN network; and for non-seamless offload, the NAS stratum can deactivate all the traffic (the PDN connection) of the UE at the UMTS/LTE network or can only maintain the bearers (without transmitting any traffic). The AS stratum of the UE transmits the RRC Connection Reconfigure Complete message to the base station to notify the base station that the switching of all the bearers has been completed.

Furthermore the WLAN switch timer can be carried in the reconfiguration message, and the UE searches for an appropriate AP according to the redirection information in the time length of the timer, and if the UE still has not located any appropriate AP for association when the timer expires, then the UE still keeps connected with the source network (the UMTS/LTE network). The UE transmits the RRC Connection Reconfigure Complete message to the network and indicates the failure in switching the bearers.

Based upon the same inventive idea, an embodiment of the invention further provides a heterogeneous network switching device, and since the device addresses the problem under a similar principle to the heterogeneous network switching method according to the embodiment of the invention, reference can be made to the implementation of the method for an implementation of the device, so a repeated description thereof will be omitted here.

Figure 9:
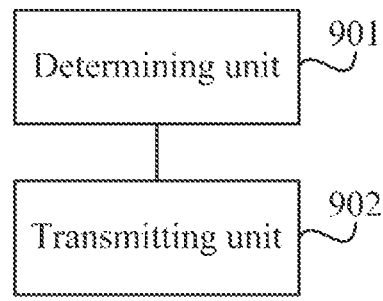
FIG. 9 illustrates a first schematic structural diagram of a heterogeneous network switching device according to an embodiment of the invention.

An embodiment of the invention provides a heterogeneous network switching device which can particularly a base station or another network-side device, e.g., a Node B in a UMTS system or an eNB in an LTE system, and as illustrated in FIG. 9, the device includes:

A determining unit 901 is configured to determine that a UE needs to be switched to a non-3GPP network; and A transmitting unit 902 is configured to transmit, to the UE, switch signaling which carries a switch instruction to instruct the UE to switch a part or all of carriers from a 3GPP network to the non-3GPP network.

Here the determining unit 901 is configured:

To determine that the UE is located in a coverage area of the non-3GPP network; or To determine that the UE is located in a coverage area of the non-3GPP network, and to determine traffic of the UE to be offloaded according to a load of the device.

When the switch signaling is an RRC Connection Reconfigure message, the device further includes:

A requesting unit is configured to request a core network for releasing a part or all of the bearers of the UE.

Furthermore the switch signaling further includes:

A switch timing instruction instructs the UE to keep connected with the source network or to access the source network again when the UE has not be associated with a target AP successfully after a preset period of time is exceeded.

Figure 10:
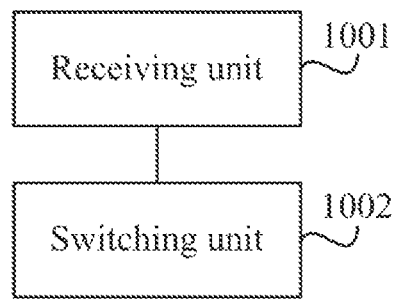
FIG. 10 illustrates a second schematic structural diagram of a heterogeneous network switching device according to an embodiment of the invention.

An embodiment of the invention provides a heterogeneous network switching device which can particularly be a UE, and as illustrated in FIG. 10, the device includes:

A receiving unit 1001 is configured to receive switch signaling, which carries a switch instruction, transmitted by a base station after the base station determines the User Equipment (UE) needs to be switched to a non-3GPP network; and A switching unit 1002 is configured to switch a part or all of bearers from a 3GPP network to the non-3GPP network in response to the switch instruction.

When the switch signaling is an RRC Connection Release message, the switching unit 1002 is configured:

To release an air interface connection, and to search for a corresponding access point for association in response to the switch instruction, and To set up a corresponding PDN connection or to access the Internet; and When the switch signaling is an RRC Connection Reconfigure message, the switching unit 1002 is configured:

To search for a corresponding access point for association,

To set up a corresponding PDN connection or to access the Internet, and

To transmit an RRC Connection Reconfigure Complete message to the base station to notify the base station that the corresponding switching of the bearers has been completed.

Furthermore the switching unit 1002 is further configured:

To keep connected with a source network or to access the source network again when determining, according to a switch timing instruction in the switch signaling. that the UE has not be associated with a target AP successfully after a preset period of time is exceeded.

The structure of and processing of the base station according to the embodiment of the invention will be described below in connection with a preferred hardware structure.

Figure 11:
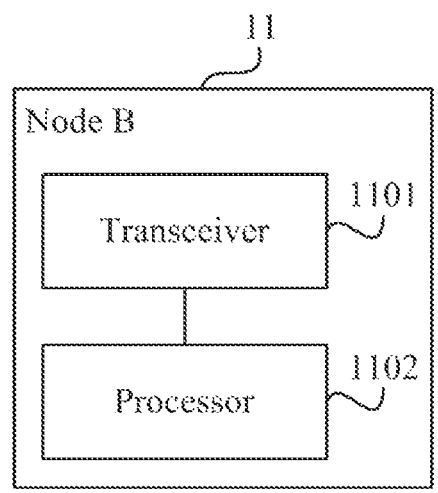
FIG. 11 illustrates a third schematic structural diagram of a heterogeneous network switching device according to an embodiment of the invention.

As illustrated in FIG. 11, the base station 11 includes a transceiver 1101, and at least one processor 1102 connected with the transceiver 1101, where:

The processor 1102 is configured to determine that a UE needs to be switched to a non-3GPP network; and The transceiver 1101 is configured to transmit, to the UE, switch signaling which carries a switch instruction to instruct the UE to switch a part or all of carriers from a 3GPP network to the non-3GPP network.

Here the processor 1102 is configured to determine that the UE is located in a coverage area of the non-3GPP network; or To determine that the UE is located in a coverage area of the non-3GPP network, and to determine traffic of the UE to be offloaded according to a load of the base station.

In an implementation, when the switch signaling is an RRC Connection Reconfigure message, the processor 1102 is further configured to request a core network for releasing a part or all of the bearers of the UE.

Furthermore the switch signaling further includes:

A switch timing instruction instructs the UE to keep connected with the source network or to access the source network again when the UE has not be associated with a target AP successfully after a preset period of time is exceeded.

The structure of and processing of the UE according to the embodiment of the invention will be described below in connection with a preferred hardware structure.

Figure 12:
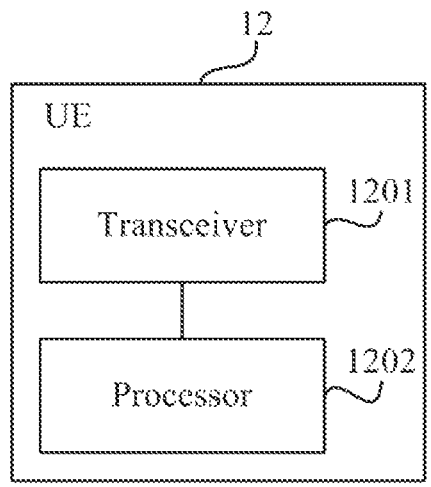
FIG. 12 illustrates a fourth schematic structural diagram of a heterogeneous network switching device according to an embodiment of the invention.

As illustrated in FIG. 12, the UE 12 includes a transceiver 1201, and at least one processor 1202 connected with the transceiver 1201, where:

The transceiver 1201 is configured to receive switch signaling, which carries a switch instruction, transmitted by a base station after the base station determines that the User Equipment (UE) needs to be switched to a non-3GPP network; and The processor 1202 is configured to switch a part or all of bearers from a 3GPP network to the non-3GPP network in response to the switch instruction.

When the switch signaling is an RRC Connection Release message, the processor 1202 is configured:

To release an air interface connection, and to search for a corresponding access point for association in response to the switch instruction, and To set up a corresponding PDN connection or to access the Internet; and When the switch signaling is an RRC Connection Reconfigure message, the processor 1202 is configured:

To search for a corresponding access point for association,

To set up a corresponding PDN connection or to access the Internet, and

To transmit an RRC Connection Reconfigure Complete message to the base station to notify the base station that the corresponding switching of the bearers has been completed.

Furthermore the processor 1202 is further configured:

To keep connected with a source network or to access the source network again when determining, according to a switch timing instruction in the switch signaling, that the UE has not be associated with a target AP successfully after a preset period of time is exceeded.

Figure 13:
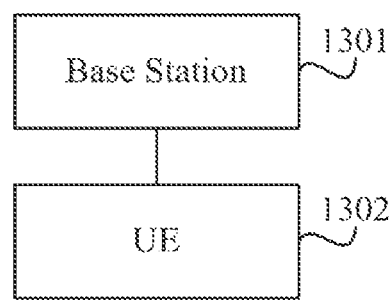
FIG. 13 illustrates a schematic structural diagram of a heterogeneous network switching system according to an embodiment of the invention.

Accordingly an embodiment of the invention further provides a heterogeneous network switching system, as illustrated in FIG. 13, including:

A base station 1301 is configured to determine a UE to be switched to a non-3GPP network; and transmit, to the UE, switch signaling which carries a switch instruction to instruct the UE to switch a part or all of carriers from a 3GPP network to a non-3GPP network; and The UE 1302 is configured to receive the switch signaling, which carries the switch instruction, transmitted by the base station after the base station determines that the User Equipment (UE) needs to be switched to the non-3GPP network; and to switch a part or all of the bearers from the 3GPP network to the non-3GPP network in response to the switch instruction.

The embodiments of the invention provide a heterogeneous network switching method, device and system so that when the Node B or another network-side device determines the UE to be switched to the non-3GPP network, the network-side device transmits to the UE the switch signaling carrying the switch instruction to instruct the UE to switch a part or all of the bearers from the 3GPP network to the non-3GPP network, so that the UE can switch a part or all of the bearers from the 3GPP network to the non-3GPP network in response to the switch instruction, thus enabling heterogeneous switching to be initiated at the network side.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A heterogeneous network switching method, comprising:
    determining, by a network-side device, that a User Equipment (UE) needs to be switched to a non-Third Generation Partnership Project (3GPP) network; and
    transmitting, by the network-side device, to the UE, switch signaling which carries a switch instruction to instruct the UE to switch a part or all of bearers from a 3GPP network to the non-3GPP network;
    wherein the network-side device determining that the UE needs to be switched to the non-3GPP network comprises:
    the network-side device determining that the UE is located in a coverage area of the non-3GPP network; or
    the network-side device determining that the UE is located in a coverage area of the non-3GPP network, and the network-side device determining traffic of the UE to be offloaded according to a load of the network-side device.

2. The method according to claim 1, wherein the switch instruction comprises:
an identifier of a target Access Point (AP) in the non-3GPP network.

3. The method according to claim 1, wherein the switch signaling is:
a Radio Resource Control (RRC) Connection Release message or an RRC Connection Reconfigure message.

4. The method according to claim 3, wherein when the switch signaling is the RRC Connection Reconfigure message, the method further comprises:
requesting a core network for releasing a part or all of the bearers of the UE.

5. The method according to claim 1, wherein the switch signaling further comprises:
a switch timing instruction to instruct the UE to keep connected with a source network or to access the source network again when the UE has not been associated with a target AP successfully after a preset period of time is exceeded.

6. A heterogeneous network switching method, comprising:
receiving, by a User Equipment (UE), switch signaling, which carries a switch instruction, transmitted by a base station after the base station determines that the UE needs to be switched to a non-Third Generation Partnership Project (3GPP) network; and
switching, by the UE, a part or all of bearers from a 3GPP network to the non-3GPP network in response to the switch instruction;
wherein the switch signaling is an RRC Connection Release message or an RRC Connection Reconfigure message;
wherein when the switch signaling is the RRC Connection Release message, switching a part or all of the bearers from the 3GPP network to the non-3GPP network in response to the switch instruction comprises:
releasing an air interface connection, and searching for a corresponding access point for association, in response to the switch instruction, and
setting up a corresponding Packet Data Network (PDN) connection or accessing the Internet; and
when the switch signaling is the RRC Connection Reconfigure message, switching a part or all of the bearers from the 3GPP network to the non-3GPP network in response to the switch instruction comprises:
searching for a corresponding access point for association,
setting up a corresponding PDN connection or accessing the Internet, and
transmitting an RRC Connection Reconfigure Complete message to the base station to notify the base station that the corresponding switching of the bearers has been completed.

7. The method according to claim 6, wherein the base station determines that the UE needs to be switched to the non-3GPP network comprises:
determining that the UE is located in a coverage area of the non-3GPP network; or
determining that the UE is located in a coverage area of the non-3GPP network, and determining traffic of the UE to be offloaded according to a load of the base station.

8. The method according to claim 6, wherein the switch instruction comprises:
an identifier of a target Access Point (AP) in the non-3GPP network.

9. The method according to claim 6, further comprises:
keeping connected with a source network or accessing the source network again when determining, according to a switch timing instruction in the switch signaling, that the UE has not be associated with a target AP successfully after a preset period of time is exceeded.

10. A base station, comprising:
a processor configured to determine that a User Equipment (UE) needs to be switched to a non-Third Generation Partnership Project (3GPP) network; and
a transceiver configured to transmit, to the UE, switch signaling which carries a switch instruction to instruct the UE to switch a part or all of carriers from a 3GPP network to the non-3GPP network;
wherein the processor is configured:
to determine that the UE is located in a coverage area of the non-3GPP network; or
to determine that the UE is located in a coverage area of the non-3GPP network, and to determine traffic of the UE to be offloaded according to a load of the base station.

11. The base station according to claim 10, wherein when the switch signaling is an RRC Connection Reconfigure message, the processor is further configured to request a core network for releasing a part or all of the bearers of the UE.

12. The base station according to claim 10, wherein the switch signaling further comprises:
a switch timing instruction to instruct the UE to keep connected with a source network or to access the source network again when the UE has not be associated with a target AP successfully after a preset period of time is exceeded.

13. A User Equipment (UE), comprising:
a transceiver configured to receive switch signaling, which carries a switch instruction, transmitted by a base station after the base station determines that the User Equipment (UE) needs to be switched to a non-Third Generation Partnership Project (3GPP) network; and
a processor configured to switch a part or all of bearers from a 3GPP network to the non-3GPP network in response to the switch instruction;
wherein when the switch signaling is a Radio Resource Control (RRC) Connection Release message, the processor is configured:
to release an air interface connection, and to search for a corresponding access point for association, in response to the switch instruction, and
to set up a corresponding Packet Data Network (PDN) connection or to access the Internet; and
when the switch signaling is an RRC Connection Reconfigure message, the processor is configured:
to search for a corresponding access point for association,
to set up a corresponding PDN connection or to access the Internet, and
to transmit an RRC Connection Reconfigure Complete message to the base station to notify the base station that the corresponding switching of the bearers has been completed.

14. The UE according to claim 13, wherein the processor is further configured:
to keep connected with a source network or to access the source network again when determining, according to a switch timing instruction in the switch signaling, that the UE has not be associated with a target AP successfully after a preset period of time is exceeded.

\* \* \* \* \*